April 25, 1939.   A. K. HARFORD   2,155,859
MANUFACTURE OF SPIRAL PIPE
Filed Nov. 22, 1935
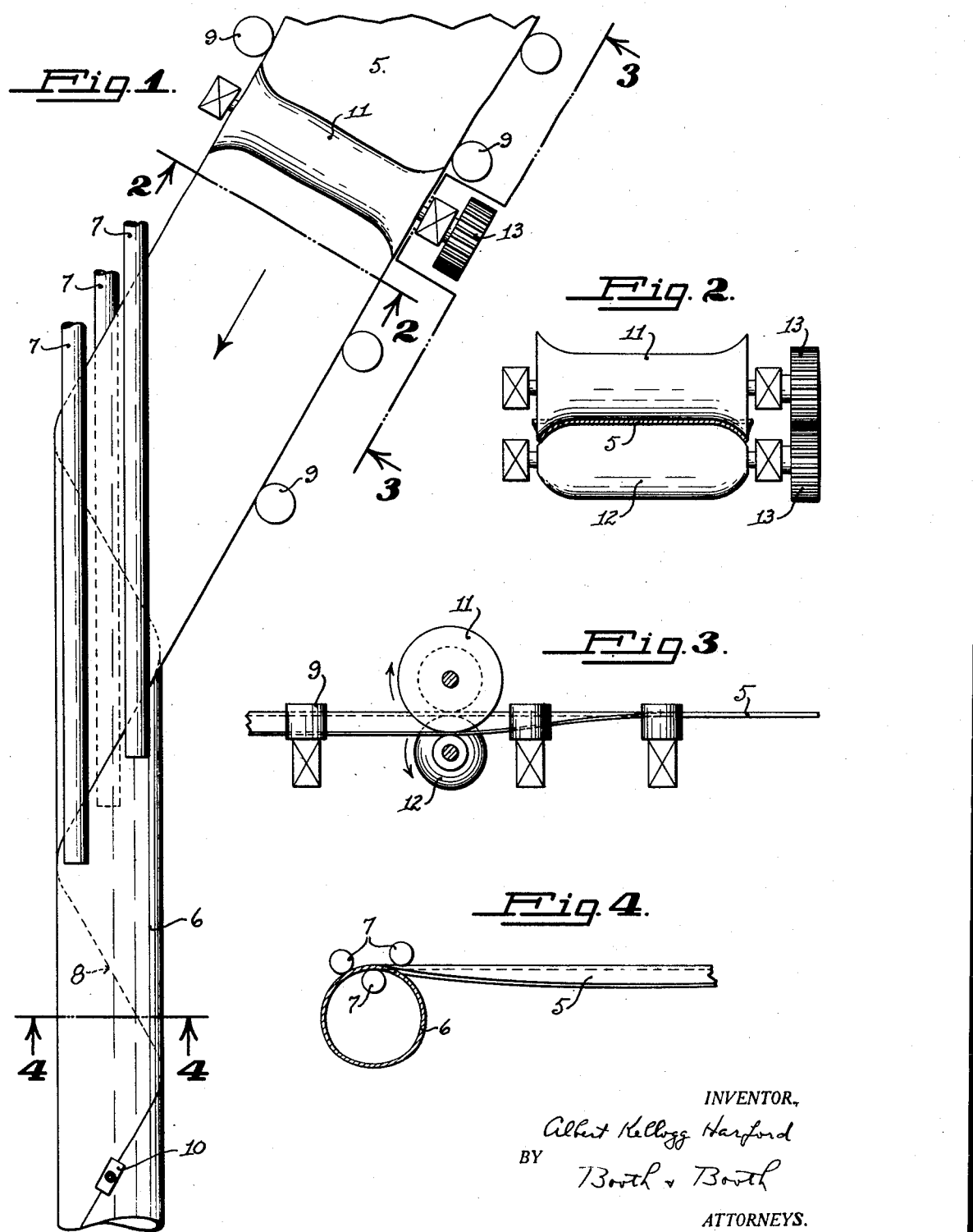

Patented Apr. 25, 1939

2,155,859

UNITED STATES PATENT OFFICE 2,155,859

MANUFACTURE OF SPIRAL PIPE

Albert Kellogg Harford, Oakland, Calif., assignor, by mesne assignments, to The American Rolling Mill Company, Middletown, Ohio, a corporation of Ohio Application November 22, 1935, Serial No. 51,053

3 Claims. (Cl. 113—35)

The present invention relates to the art of making spiral pipe by helically winding a sheet or strip of metal into tubular form and joining the adjacent edges together in a helical seam.

The principal objects of the invention is to provide for feeding the strip to the bending or winding means in such a manner as to prevent buckling under the endwise pressure exerted by the feeding means. A second object is to provide for winding the strip into true cylindrical form without distortion of its edges, so that said edges will lie closely together to facilitate the forming of the helical seam. Other objects and advantages of the invention will be brought out in the following specification, which should be read with the understanding that changes, within the scope of the claims hereto appended, may be made in the construction and operation of the several parts herein shown and described, without departing from the spirit of the invention.

Reference will be made to the accompanying drawing in which

Fig. 1 is a partly diagrammatic plan view of an apparatus for carrying out the invention.

Figs. 2, 3 and 4 are vertical sectional views taken on the respective lines 2—2, 3—3, and 4—4 of Fig. 1.

In the drawing, the reference numeral 5 designates a sheet or strip of metal which is wound helically to form a tube 6. Any suitable winding means may be employed, but for the sake of illustration I have indicated three rolls 7 arranged with their axes parallel to the axis of the tube 6, the sheet in passing between said rolls being bent to the diameter of the tube 6. The sheet 5 is fed to the bending means at the proper angle to cause its edges to lie adjacent each other, as indicated at 8. Guide rolls indicated at 9 may be provided for maintaining the proper angular position of the incoming sheet. The adjacent edges 8 are joined together to form a permanent helical seam by any suitable means as, for example, a welder, indicated at 10.

A pair of cooperating rolls 11 and 12 are provided, between which the sheet 5 passes before it reaches the winding means 7. The rolls 11 and 12 preferably have their axes at right angles to the direction of feed and they are so formed as to give the sheet a transverse curvature, as shown in Fig. 2. The incoming sheet, before it reaches the rolls 11 and 12, may be and ordinarily is flat, but in passing between said rolls it receives a transverse curvature which may extend throughout its entire width, or preferably, as shown in Fig. 2, is confined to the edge portions of said sheet. The exact shape of the transverse curvature imparted by the rolls 11 and 12, is immaterial except however that the edge portions of the sheet should be curved inwardly, that is toward the axis of the wound tube. In passing between the winding rolls 7 or through any other winding means that may be employed, the curvature of the sheet is again changed to that of the finished pipe, that is to say, its curvature is changed from the transverse form imparted by the rolls 11 and 12 to the diagonal curvature which forms it into the helically wound tube.

Two principal advantages are obtained by the transverse curving of the sheet at the rolls 11 and 12. In the first place, that portion of the sheet between said rolls 11 and 12 and the winding means 7 is rendered much stiffer to resist endwise thrust than if it remained as a flat sheet. The rolls 11 and 12 can therefore be geared together, as indicated at 13, and may be supplied with power from an outside source, not shown, to cause them to forcibly feed the sheet to and through the winding means 7. The stiffness of the transversely curved sheet is so great that the entire feeding effort can be supplied by the rolls 11 and 12, and the winding rolls 7 can be idlers or can be replaced with a stationary cylindrical former. In other words, the sheet can be pushed through any kind of winding means entirely by the feeding action of the rolls 11 and 12 without danger of buckling between said rolls and the winding means.

The other principal advantage of transversely curving the incoming sheet is that it is caused thereby to issue from the winding means as a true cylinder. Experience has shown that when a flat sheet, especially of heavy metal, is wound helically into tubular form, the edges of the sheet have a tendency to flare outwardly from the cylindrical plane of the central portion of the sheet. This results in a helical ridge on the outside of the pipe, and makes it difficult to unite the edges properly, especially by welding, to form a perfect seam. However, by initially curling the edges of the sheet inwardly, as is done by the feed rolls 11 and 12, the tendency of said edges to flare outwardly as a result of the helical winding operation is counteracted, and the tube issues from the winding means as a true cylinder with its edges in perfect alignment, so that the welding operation can be carried out more rapidly and without danger of defects.

I claim:

1. Apparatus for making spiral pipe comprising rolls for guiding a sheet of metal helically into tubular form, means for joining the edges of the wound sheet to form a helical seam, and a pair of rolls between which the sheet passes and by which it is pushed into said guiding means, said rolls being shaped to curve the sheet transversely.

2. Apparatus for making spiral pipe comprising rolls for guiding a sheet of metal helically to tubular form, means for joining the edges of the wound sheet to form a helical seam, and elements for driving said sheets into said guide means, said elements having cooperating complementary curved surfaces for imparting to said sheet a transverse curvature coincident to said driving action.

3. The method of making smooth walled spiral pipe, which includes the steps of driving an unsupported column of metal which normally is subject to buckling, by means of elements having cooperating complementary curved surfaces, thereby imparting to said strip a transverse curvature by means of the driving means, into guiding rolls which serve to form said metal into helical shape, and joining the edges of the sheet to form a helical seam.

ALBERT KELLOGG HARFORD.